(12) United States Patent
Ierullo

(10) Patent No.: US 12,375,908 B2
(45) Date of Patent: Jul. 29, 2025

(54) METHOD AND SYSTEM FOR CHAIN OF CUSTODY VERIFICATION

(71) Applicant: MALIKIE INNOVATiONS LIMITED, Dublin (IE)

(72) Inventor: Salvatore Ierullo, Oakville (CA)

(73) Assignee: Malikie Innovations Limited (IE)

( * ) Notice: Subject to any disclaimer, the term of this patent is extended or adjusted under 35 U.S.C. 154(b) by 240 days.

(21) Appl. No.: 15/879,928

(22) Filed: Jan. 25, 2018

(65) Prior Publication Data
US 2019/0230504 A1 Jul. 25, 2019

(51) Int. Cl.
*G06Q 30/018* (2023.01)
*G06Q 10/0833* (2023.01)
*G06Q 10/10* (2023.01)
*G06Q 30/02* (2023.01)
*G06Q 30/06* (2023.01)
*H04L 9/08* (2006.01)
*H04L 9/40* (2022.01)
*H04W 12/04* (2021.01)

(52) U.S. Cl.
CPC ........ *H04W 12/04* (2013.01); *G06Q 10/0833* (2013.01); *G06Q 30/018* (2013.01); *H04L 9/0825* (2013.01); *H04L 63/126* (2013.01)

(58) Field of Classification Search
CPC G06Q 10/0833; G06Q 30/018; H04L 63/126; H04L 9/0825; H04W 12/04
USPC .................................................. 705/317, 1.1
See application file for complete search history.

(56) References Cited

U.S. PATENT DOCUMENTS

| | | | | |
|---|---|---|---|---|
| 7,242,279 B2* | 7/2007 | Wolfe | ................... | G06Q 10/08 340/5.9 |
| 8,068,023 B2* | 11/2011 | Dulin | ....................... | B60P 3/03 340/572.1 |
| 8,334,773 B2* | 12/2012 | Cova | ...................... | G06Q 10/08 340/572.1 |
| 8,392,296 B2* | 3/2013 | Powers | ................... | E05B 51/02 705/28 |
| 8,461,958 B2* | 6/2013 | Saenz | .................. | G06Q 10/087 340/3.1 |
| 8,477,011 B2* | 7/2013 | Tubb | ....................... | E05B 39/00 340/5.73 |
| 8,855,311 B1 | 10/2014 | Clement et al. | | |
| 9,087,315 B1* | 7/2015 | Meyers | ............... | G06Q 20/203 |
| 9,386,553 B2* | 7/2016 | Berger | ................... | G06Q 10/08 |
| 9,558,468 B2* | 1/2017 | Donlan | .............. | G06Q 10/0833 |
| 9,633,327 B2* | 4/2017 | Hamm | ............... | G06Q 10/0833 |
| 10,388,161 B2* | 8/2019 | Troutman | ............ | G07C 5/0825 |

(Continued)

OTHER PUBLICATIONS

15879928 NPL—EIC 3600 Search Report 081720 (Year: 2020).*

(Continued)

*Primary Examiner* — Jonathan P Ouellette
(74) *Attorney, Agent, or Firm* — Botos Churchill IPLaw LLP

(57) ABSTRACT

A method at a network element for verification of chain of custody of goods within a portable container, the method including receiving, from a computing device associated with the portable container, first log data; receiving, from at least one transit element that interacted with the computing device associated with the portable container during transport of the goods, second log data; and correlating the first log data and the second log data to verify the chain of custody of the goods.

20 Claims, 11 Drawing Sheets

(56) References Cited

U.S. PATENT DOCUMENTS

| | | | | |
|---|---|---|---|---|
| 10,546,163 | B2* | 1/2020 | Burch, V | G06K 7/10415 |
| 11,176,609 | B2* | 11/2021 | Lim | G01S 5/0205 |
| 2004/0178880 | A1* | 9/2004 | Meyer | B60R 25/1004 |
| | | | | 340/5.22 |
| 2005/0055268 | A1* | 3/2005 | Schmidtberg | G06Q 10/0639 |
| | | | | 705/13 |
| 2005/0073406 | A1* | 4/2005 | Easley | G06Q 10/08 |
| | | | | 340/10.41 |
| 2005/0083172 | A1 | 4/2005 | Bates | |
| 2006/0250235 | A1* | 11/2006 | Astrin | G08B 25/10 |
| | | | | 340/539.22 |
| 2007/0290836 | A1* | 12/2007 | Ainsworth | G06Q 10/08 |
| | | | | 340/539.13 |
| 2009/0322510 | A1* | 12/2009 | Berger | H04W 60/00 |
| | | | | 340/568.1 |
| 2010/0332359 | A1* | 12/2010 | Powers | E05B 83/02 |
| | | | | 705/28 |
| 2013/0128455 | A1* | 5/2013 | Koblenz | H05K 7/20836 |
| | | | | 361/692 |
| 2013/0211870 | A1* | 8/2013 | Lawson | H04L 67/125 |
| | | | | 705/7.25 |
| 2014/0061315 | A1* | 3/2014 | Mehring | G06K 19/0702 |
| | | | | 235/492 |
| 2014/0136218 | A1* | 5/2014 | Bolene | G06Q 10/0832 |
| | | | | 705/2 |
| 2014/0357295 | A1* | 12/2014 | Skomra | G08G 1/202 |
| | | | | 455/456.1 |
| 2015/0262123 | A1* | 9/2015 | Sharma | G06Q 10/0833 |
| | | | | 705/333 |
| 2016/0012696 | A1* | 1/2016 | Robinton | G06Q 10/0833 |
| | | | | 340/572.1 |
| 2017/0180341 | A1* | 6/2017 | Walker | H04L 9/3242 |
| 2018/0365386 | A1* | 12/2018 | Vanderveen | G16H 40/67 |

OTHER PUBLICATIONS

European Patent Office, Extended European Search Report for Application No. 19151723.4, issued Feb. 22, 2019.

International Searching Authority, International Search Report for Application PCT/EP2017/075570 issued Dec. 1, 2017.

Specification of PCT International Application No. PCT/EP2017/075570, international filing date of Oct. 6, 2017.

European Office Action, EP Application No. 19151723.4, Issued Mar. 29, 2021.

Office Action issued in corresponding Canadian Patent Application No. 3029427, mailed Oct. 5, 2023, 4 pages.

Summons to Attend Oral Proceedings, European Patent Application No. 19 151 723.4, dated Oct. 14, 2022, pp. 1-6.

* cited by examiner

METHOD AND SYSTEM FOR CHAIN OF CUSTODY VERIFICATION

FIELD OF THE DISCLOSURE

The present disclosure relates to transportation of goods, and in particular relates to chain of custody tracking during transportation of goods.

BACKGROUND

During the transportation of goods, in some instances it may be important to verify the chain of custody for such goods from the origin to the destination. Generally, chain of custody refers to any instance in which traceability is paramount. Examples where chain of custody tracking may be important, for example, include evidence collection in criminal matters, athlete drug testing, appellation certification to authenticate the country or region of origin of foods or beverages, organ transplants, sustainably sourced products, among other options.

Break in the chain of custody can occur at any step between the origin and destination and can result in evidence being excluded in criminal or drug testing cases, counterfeit goods entering the market undetected, or may call into question the source of a product, among other issues.

However, tracking chain of custody in a secure manner can be problematic. A breakdown can occur at various stages, including during transit, transfer or within the documentation of the chain of custody itself.

BRIEF DESCRIPTION OF THE DRAWINGS

The present disclosure will be better understood with reference to the drawings, in which.

DETAILED DESCRIPTION OF THE DRAWINGS

The present disclosure provides a method at a network element for verification of chain of custody of goods within a portable container, the method comprising: receiving, from a computing device associated with the portable container, first log data; receiving, from at least one transit element that interacted with the computing device associated with the portable container during transport of the goods, second log data; and correlating the first log data and the second log data to verify the chain of custody of the goods.

The present disclosure further provides a network element configured for verification of chain of custody of goods within a portable container, the network element comprising: a processor; and a communications subsystem,
wherein the network element is configured to: receive, from a computing device associated with the portable container, first log data; receive, from at least one transit element that interacted with the computing device associated with the portable container during transport of the goods, second log data; and correlate the first log data and the second log data to verify the chain of custody of the goods.

The present disclosure further provides a computer readable medium for storing instruction code for verification of chain of custody of goods within a portable container, the instruction code when executed by a processor of a network element being configured to cause the network element to: receive, from a computing device associated with the portable container, first log data; receive, from at least one transit element that interacted with the computing device associated with the portable container during transport of the goods, second log data; and correlate the first log data and the second log data to verify the chain of custody of the goods.

In accordance with the embodiments of present disclosure, a locking and tracking unit may be applied to a container that may be deployed into the field. For example, such container may be any portable container and may, for example include a strong box, briefcase, shipping container, evidence box, secure envelope, intermodal containers, aircraft shipping bins, lock boxes, among other options.

Further, in accordance with the embodiments disclosed herein, such tracking and reporting unit can communicate with other tracking and reporting units in order to provide a log of the chain of custody of goods within the first container. In particular, the locking and tracking unit of the first container may communicate with another container or with other shipping infrastructure or transit elements in order to create a chain of custody for goods.

Further, in accordance with various embodiments of the present disclosure, each container or infrastructure unit or other transit element may then provide a report or log to a server or network element, which may then correlate the log data to look for anomalous conditions.

Figure 1:
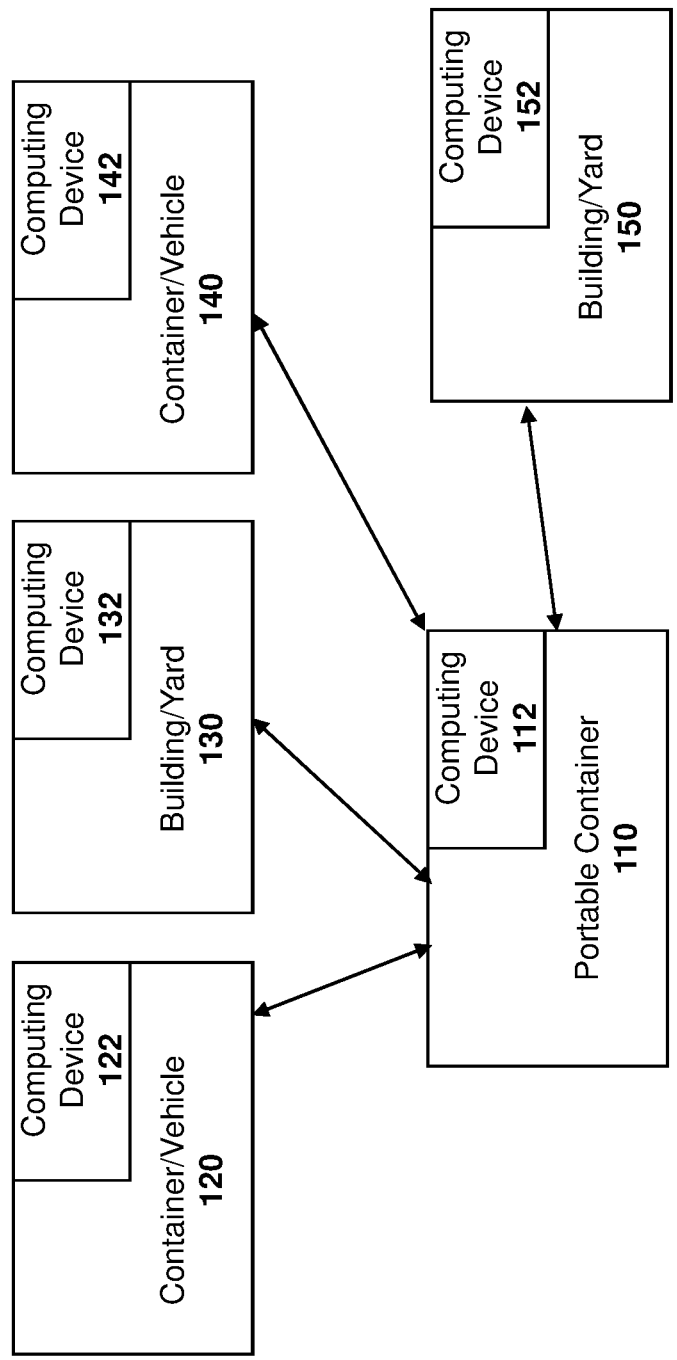
FIG. 1 is a block diagram of elements within a transportation environment.

Reference is now made to FIG. 1, which shows an environment for the present disclosure. In particular, a portable container 110 may be any container that is used to secure items in which chain of custody is required. Portable container 110 may, for example, be a strong box, lock box, evidence box, shipping container, secure envelope, among other options.

As described below, portable container 110 includes a computing device 112 which may be used for a variety purposes. Computing device 112 may provide for lock actuation in order to track when portable container 110 is opened and closed.

Computing device 112 may further include sensors and communications capabilities. Sensors associated with the computing device may be either physically part of the sensor apparatus, for example a built in global navigation satellite system or such as a global positioning system (GPS) chipset, or may be associated with the computing device through short range wired or wireless communications. For example, a camera may be part of the computing device or may communicate with the computing device through wired or wireless technologies. Further, sensors may include temperature sensors to monitor the temperature within the portable container 110. Sensors may further include vibration sensors, accelerometers, light sensors, door opening or closing sensors, among other options.

Communications capabilities allow computing device 112 to communicate with network elements such as servers, as well as other computing devices. Thus, in accordance with the embodiment of FIG. 1, computing device 112 may be any apparatus that is capable of providing data or information from sensors associated with the computing device to a central monitoring station or control station.

In accordance with the present disclosure, container 110 may be placed within another container 120. For example, container 110 may be placed within a shipping container, truck, other vehicle, ship, among other options. As used herein, the term vehicle can include any self-propelled vehicle such as a truck, tractor, car, boat, aircraft, motorcycle, bicycle, snow machine, among others and can further include a trailer, shipping container, secure box, sealed envelope or other cargo moving container, whether attached to the self-propelled vehicle or not.

Such container or vehicle 120 may include a computing device 122 which has at least communication capabilities to communicate with computing device 112. In other embodiments, computing device 122 may further have sensors such as location sensors, temperature sensors, vibration sensors, accelerometers, light sensors, among other options.

Further, container 110 may be transferred to any building, shipping yard, warehouse or facility. In accordance with the present disclosure, a building or yard 130 may include a computing device 132 which again has at least communication capabilities that may communicate with computing device 112 of portable container 110.

The embodiment of FIG. 1 further shows a second container or vehicle 140 which has a computing device 142 and a second building/yard 150 which has a computing device 152. Computing devices 142 and 152 have the capability to communicate with computing device 112.

The embodiment of FIG. 1 is not limiting and in other embodiments other containers, vehicles, buildings or transit points could be part of the system for providing for chain of custody of goods from a source to a destination. Each of such other containers, vehicles, buildings or transit points may be referred to herein as a transit element.

As described with the regard to FIG. 3 below, a central monitoring station may be any server or combination of servers that are remote from the computing device. Central monitoring station can receive data from the plurality of computing devices, and, in some cases, may have software to monitor such data and provide alerts to operators if data is outside predetermined boundaries.

While the computing device 112 may have one set of sensors, the computing devices for the other containers or buildings may have different sets of sensors. For example, a computing device on a vehicle may provide for interaction with vehicle components such as tire pressure monitoring systems, temperature, vibration, among other options. A building may not require a positioning chipset and therefore computing device 132 may not have a positioning system. Other examples are possible.

Figure 2:
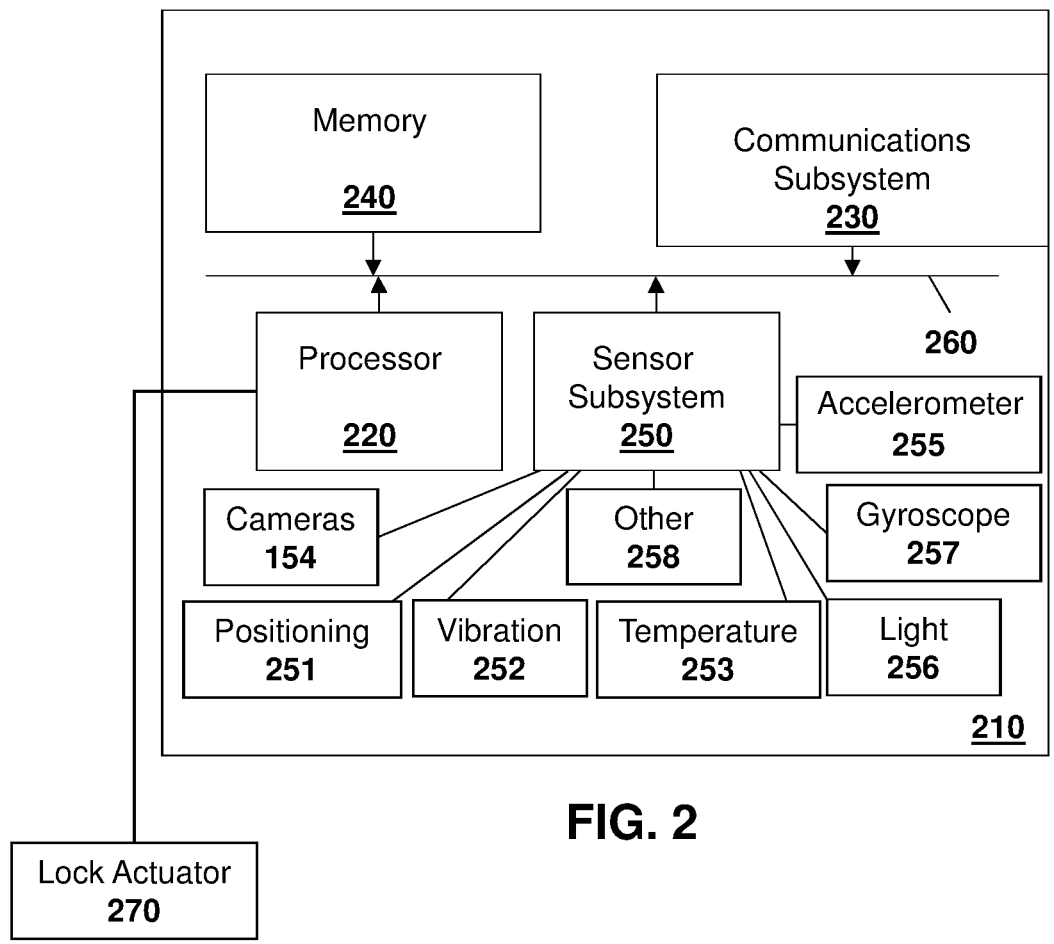
FIG. 2 is a block diagram of an example computing device associated with a container for actuating a locking mechanism on the container.

Reference is now made to FIG. 2, which shows a generalized computing device capable of being part of a portable container, building, vehicle, shipping yard, or other transit point, and could be any of computing devices 112, 122, 132, 142 or 152 from FIG. 1. However, the computing device of FIG. 2 is merely an example, and the computing device used in practice may have additional or fewer sensors than in the embodiment of FIG. 2.

In the embodiment of FIG. 2, computing device 210 can be any device or network node. Such computing device or network node may include any type of electronic device, including but not limited to, fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Computing device 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows computing device 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 230 will be dependent upon the communication network or communication technology on which the computing device is intended to operate.

Processor 220 generally controls the overall operation of the computing device 210 and is configured to execute programmable logic, which may be stored, along with data, using memory 240. Memory 240 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 240, computing device 210 may access data or programmable logic from an external storage medium, for example through communications subsystem 230.

In the embodiment of FIG. 2, computing device 210 may utilize a plurality of sensors, which may either be part of computing device 210 in some embodiments or may communicate with computing device 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors 254, accelerometer 255, light sensors 256, gyroscopic sensors 257, and other sensors 258. Other sensors may be any sensor that is capable of reading or obtaining data that may be useful for the computing device 210. However, the sensors shown in the embodiment of FIG. 2 are merely examples, and in other embodiments different sensors or a subset of sensors shown in FIG. 2 may be used. For example, in some cases the only sensor may be a positioning sensor such as a Global Navigation Satellite System (GNSS) sensor. In other cases no sensors may be part of computing device 210.

Communications between the various elements of computing device 210 may be through an internal bus 260 in one embodiment. However, other forms of communication are possible.

In accordance with some embodiments of the present disclosure, a lock actuating mechanism 270 may be controlled by computing device 210. Lock actuating mechanism 270 may, for example, include a relay and motor to control the sliding of at least one locking bolt into and out of frame elements on the container. However, other mechanisms to physically prevent opening of a container would be known to those in the art, and the present disclosure is not limited to any particular locking mechanism.

Computing device 210 may be affixed to any fixed or portable platform. For example, computing device 210 may be affixed to shipping containers, truck trailers, truck cabs in one embodiment. In other embodiments, computing device 210 may be affixed to any vehicle.

In other cases, computing device 210 could be carried by a user.

In other cases, computing device 210 may be part of a container that could be carried on or within a vehicle.

Such a computing device 210 may be a power limited device. For example computing device 210 could be a battery operated device that can be affixed to a shipping container or trailer in some embodiments. Other limited power sources could include any limited power supply, such as a small generator or dynamo, a fuel cell, solar power, energy harvesting, among other options.

In other embodiments, computing device 210 may utilize external power, for example from the engine of a tractor pulling the trailer, from a land power source for example on a plugged in recreational vehicle or from a building power supply, among other options.

External power may further allow for recharging of batteries to allow the computing device 210 to then operate in a power limited mode again. Recharging methods may also include other power sources, such as, but not limited to, solar, electromagnetic, acoustic or vibration charging.

The computing device from FIG. 2 may be used in a variety of environments. One example environment in which the computing device may be used is shown with regard to FIG. 3.

Figure 3:
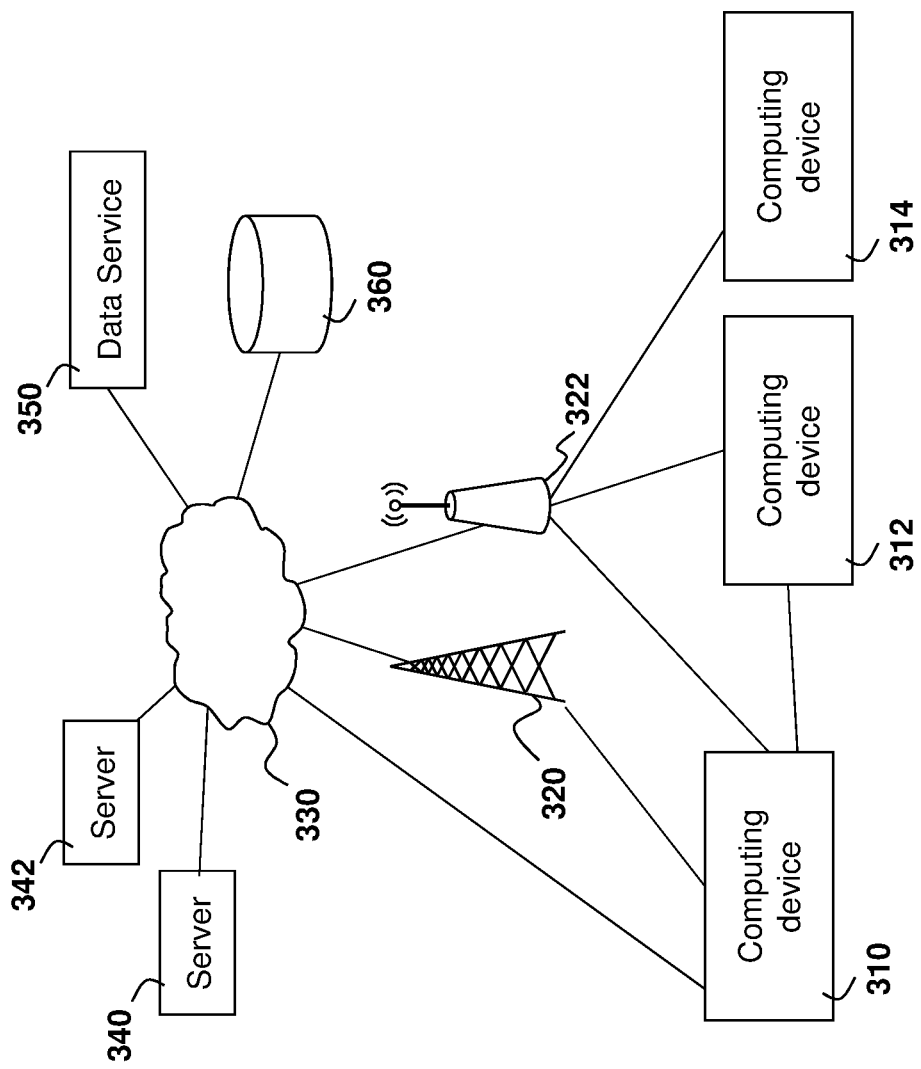
FIG. 3 is a block diagram of an example architecture for the computing device of FIG. 2.

Referring to FIG. 3, three computing devices, namely computing device 310, computing device 312, and computing device 314 are provided.

In the example of FIG. 3, computing device 310 may communicate through a cellular base station 320 or through an access point 322. Access point 322 may be any wireless communication access point.

Further, in some embodiments, computing device 310 could communicate through a wired access point such as Ethernet or fiber, among other options.

The communication may then proceed over a wide area network such as Internet 330 and proceed to servers 340 or 342.

Similarly, computing device 312 and computing device 214 may communicate with servers 340 or server 342 through one or both of the base station 320 or access point 322, among other options for such communication.

In other embodiments, any one of computing devices 310, 312 or 314 may communicate through satellite communication technology. This, for example, may be useful if the computing device is travelling to areas that are outside of cellular coverage or access point coverage.

In other embodiments, computing device 312 may communicate with computing device 310 to allow computing device 310 to act as a relay for communications or to exchange information between the computing devices.

Communication between computing device 310 and server 340 may be one directional or bidirectional. Thus, in one embodiment, computing device 310 may provide information to server 340 but server 340 does not respond. In other cases, server 340 may issue commands to computing device 310 but data may be stored internally on computing device 310 until the container arrives at a particular location, possibly during a particular time window. In other cases, two-way communication may exist between computing device 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of computing devices 310, 312, 314, etc. For example, the server may be located essentially anywhere so long as it has network access to communicate with computing devices 310, 312, 314, etc.

Server 340 may, for example, be a fleet management centralized monitoring station. In this case, server 340 may receive information from a sensor apparatus associated with various trailers or cargo containers, providing information such as the location of such cargo containers, the temperature within such cargo containers, any unusual events including sudden decelerations, temperature warnings when the temperature is either too high or too low, among other data. The server 340 may compile such information and store it for future reference. It may further alert an operator. For example, a sudden deceleration event may indicate that a trailer may have been in an accident and the operator may need to call emergency services and potentially dispatch another tractor to the location.

In other embodiments, server 340 may be an inventory tracking server which is used to track inventory location or maintain chain of custody information. Such inventory tracking system may be associated with a shipper, a receiver, an auditor, a government or law enforcement agency, or a transport company, among other options.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription based service used by server 340 to obtain current road and weather conditions, or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more computing devices 310, 312, or 314 for processing at those sensor apparatuses.

In some cases, server 340 may be used to provide one or more keys to computing device 310. Further, in some cases unlocking or locking actions may take place using server 340. Other options are possible.

A computing device such as that described in FIGS. 1 to 3 above may be used to control the locking and unlocking of a portable container.

Security for the Portable Container

In accordance with one embodiment of the present disclosure, a container can be locked and unlocked based on a policy within a computing device on the container. The policy may include keys that may be used for unlocking. Further, in some embodiments the policy may include a geographic location or area in which unlocking of the container is permitted, possibly within a particular time window.

The unlocking utilizes keys that can be verified prior to the unlocking of the container. There are a number of options for the implementation of keys. Both server generated key pairs and pre-distributed key pairs are possible.

Possible key implementations include symmetric keys or asymmetric keys such as public/private key pairs. Both types of keys may be generated by a server remote from a computing device associated with the container in some embodiments. However, in other embodiments the computing device itself may generate the encryption keys.

In the case where public and private key pairs are generated on a server, the private keys may be transmitted securely to parties that will do the locking or unlocking. Such parties may include, for example, the sender or receiver, a system administrator, in some cases a driver, in some cases an auditor or other third party to the transaction, among other options.

Further, public keys are transmitted to any party that needs to verify the operation. This may include, for example, the locking device itself, third-party auditors, among other options.

The keys may be embedded in any digital data structure or storage device, including but not limited to certificates such as an X500 series certificate, a USB key, and near field communications (NFC) tag, among other options.

In accordance with one embodiment of the present disclosure, new keys may be generated and transmitted to various parties or devices on a per trip basis, essentially making them one time keys.

Figure 4:
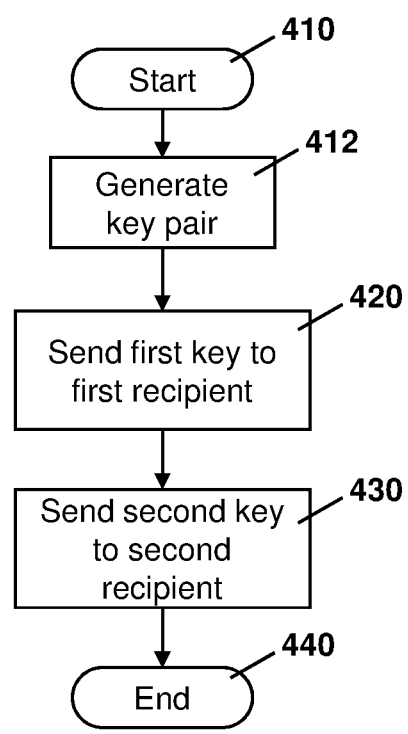
FIG. 4 is a process diagram showing key distribution in accordance with the embodiments of the present disclosure.

Reference is now made to FIG. 4 which shows the process for generating and distributing public and private key pairs.

In particular, the process of FIG. 4 starts at block 410 and proceeds to block 412 in which a trusted server or trusted device generates a key pair. Specifically, the trusted server or trusted device generates a private key and a public key associated with such private key. In some cases, trust may be established based on validation of a signature during key distribution.

From block 412 the process proceeds to block 420 in which the private key is transmitted to a first recipient. The transmission may be directly to the first recipient in some embodiments. In other embodiments, the transmission may be through a server or device. Such first recipient may, for example, be the shipper, evidence technician/drug laboratory, or goods recipient in one embodiment. In other embodiments, the first recipient may be an administrator responsible for the shipment. In this case, the sending may involve keeping the private key on the same server that generated the public/private key pair, in one instance.

The sending at block 420 would typically be done in a secure manner. For example, the first recipient may have a public/private key pair associated with the device. In this case, the private key may itself be encrypted with the public key of the recipient. In this way, the recipient, upon receiving the encrypted message containing the private key for unlocking or locking the container, will be capable of unencrypting the message using its own private key. However, other options for secure distribution are possible, including tangible memory devices such as USB keys, or other secure mechanisms such as symmetric encryption, among other options.

From block 420 the process proceeds to block 430 in which a public key is sent to a second recipient. The second recipient, as indicated above, may be a computing device associated with the locking mechanism itself, or may be an auditor, among other options. In one embodiment, the public key may be sent encrypted utilizing a public key of the recipient. In other embodiments, the public key may be signed by the server that generated the key pair. In this way, if the recipient knows that the server is a trusted device it may trust the public key for use in subsequent verification operations.

From block 430 the process proceeds to block 440 and ends.

While the embodiment of FIG. 4 provides for public key and private key pair distribution, in other embodiments other encryption technologies may be used. For example, a symmetric key may be generated at the trusted server and distributed securely both to the first recipient and the second recipient. In other cases, the distribution may be done through physical media and, in this case, the keys may be pre-generated and used multiple times.

For example, such pre-generated keys may be embedded in Bluetooth low energy (BLE) beacons, Near Field Communications (NFC) tags, Wi-Fi Aware beacons or Universal Serial Bus (USB) keys, among other options. As an example, an NFC token may be provided inside a security badge name tag. Swiping the NFC tag on NFC reader associated with the computing device on the container may trigger the key verification transaction. If successful, the verification may trigger an unlock operation for the container.

Further, in other embodiments, the key pairs may be generated locally. If done locally, the private key may be transmitted to a server or cloud service. The private key may then be used to initiate and unlock operation and the corresponding public key used to verify it. As such, the verification step can be done on the server in a connected mode scenario, or provisioned in a policy to the computing device onboard the container. In this case, policy data may include necessary public key data transmitted from the server to the computing device.

Once the keys are distributed, such keys may be used to trigger the unlocking of a container door. For example, key verification can involve a challenge where a known "blob" of data is encrypted with a public key that can only be decrypted by the private key. Such an operation verifies the correct private key is present. Such a challenge/response can be entirely executed within the computing device, or the verification can be done by transmitting data through a wireless data connection such as a cellular network to a server.

In some instances, the binary blob being encrypted and decrypted can contain a timestamp, geolocation, or other sensor data, to allow for further verification. The cryptographic unlocking operation can result in signed and verified data for auditing purposes.

Figure 5:
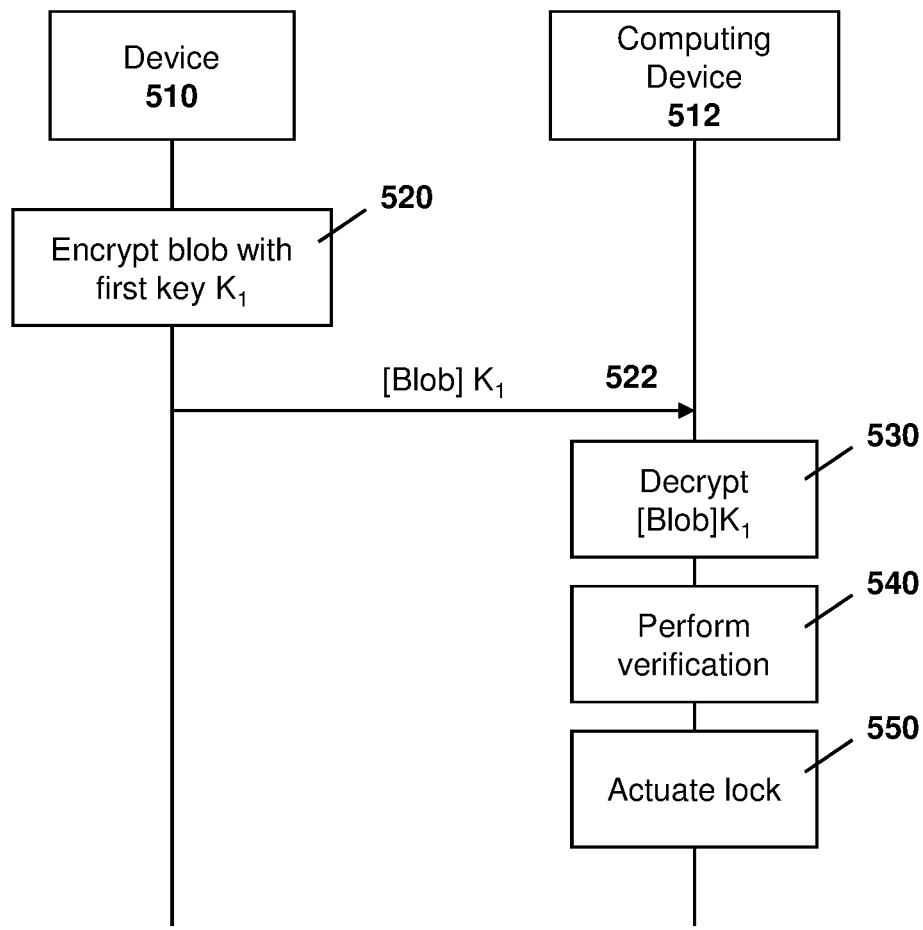
FIG. 5 is a dataflow diagram showing a device providing credentials to a computing device to actuate a locking mechanism on a container.

In particular, reference is now made to FIG. 5. In the embodiment of FIG. 5, a first device 510 communicates with a computing device 512 associated with a locking mechanism.

The first device 510 is the device that is attempting to lock or unlock the container door. For example, first device 510 may be a remote server or computing device, a smartphone, a NFC tag, among other options.

First device 510 may encrypt a blob with a first key, as shown by block 520. Such blob may, for example, be known to both first device 510 and computing device 512. In some cases, the blob may have been received from the computing device 512 at device 510.

The encrypted blob is then sent, as shown by message 522, to the computing device 512.

The computing device 512 may then decrypt the message 522, as shown at block 530.

Encryption and decryption in this case may be based on pre-distributed keys or key pairs.

The decrypted blob is then verified, as shown at block 540. Such verification may confirm that the blob is the known or anticipated message. Further, the verification may include other parameters that are supplemental to the blob itself. For example, the computing device may determine the location of the container and the verification at block 540 may ensure that the computing device is within a certain geographical boundary or a geo-fence, possibly within a particular time window, before the verification at block 540 is successful. In other cases, verification at block 540 may use other policy factors that are provisioned or programed at computing device 512.

Once the policy conditions and decryption are verified at block 540, the process proceeds to block 550 in which the locking mechanism may be actuated to lock or unlock the container. In some embodiments, the electronics may cause the lock or unlock mechanism to physically move. In other embodiments, the electronics may enable or disable the ability for a user to manually engage or disengage the locking device.

The first device 510 may be any device that has a data connection to the computing device 512. Such connection may be a wide area network connection such as over the top (OTT) cellular connection. However, it can also be a short range wired or wireless communication such as wireless local area network (WLAN), Bluetooth™, NFC, USB key, among other options. Thus, the trigger to unlock the door can use a mix of such over-the-top cellular connections to a server, or a local connection for validating the digital key.

The verification at block 540 would be unsuccessful in certain cases if policies with regard to the decryption are not met. For example, if the container is not within a geographic boundary, possibly outside a particular time window, even though the correct key was used, the container remains locked or unlocked.

Device 510 can belong to various parties. These may include the sending party, the driver, a receiving party, an auditor, an administrator, among other options. For example, in a chain of custody situation, the device 510 may be used to lock the container and may belong to an evidence technician at a crime scene, to a drug testing facility at a sports competition, to the shipper of goods where the place of origin is important to establish, among other options. Further, device 510 may be the device used for unlocking, and in the chain of custody situation may belong to an evidence storage facility, a drug testing lab, a receiver of goods whose origin is important, among other options.

Chain of Custody

Figure 6:
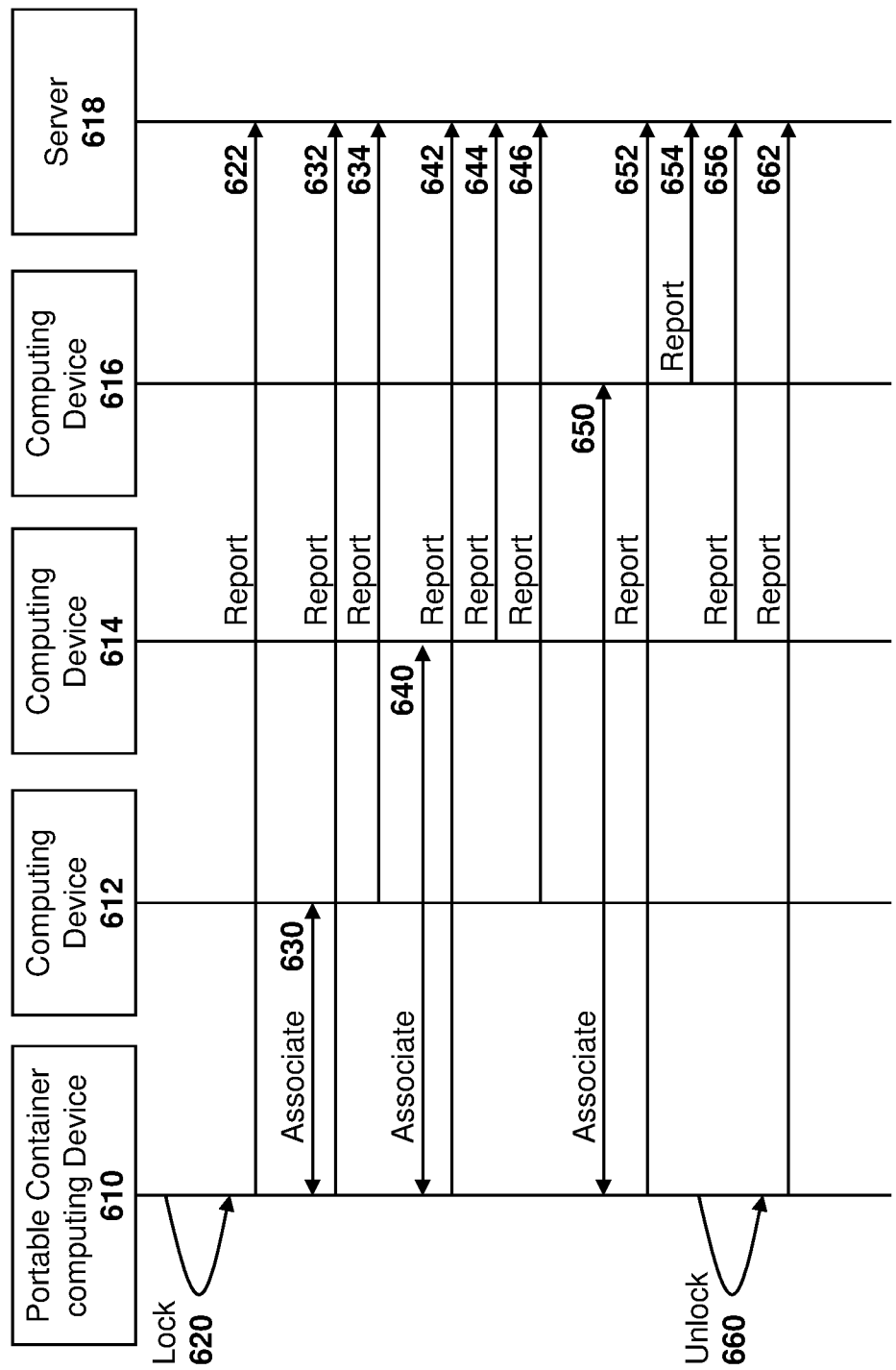
FIG. 6 is a dataflow diagram showing association of a computing device for a portable container with other computing devices, and logging thereof.

Reference is now made to FIG. 6, which is a generalized embodiment for one aspect of the present disclosure. In particular, in the embodiment of FIG. 6, a computing device 610 associated with the portable container may be similar to that of computing device 210 from FIG. 2 above.

A second computing device 612 may be associated with a transit element such as a container, vehicle, building or transit site. Computing device 614 may further be associated with a second transit element, such as a second container, vehicle, building or transit site. Similarly, computing device 616 may also be associated with a third transit element such as a container, vehicle, building or transit site.

A server 618 may be any cloud server or network element associated with the chain of custody transaction.

In the embodiment of FIG. 6, portable container is locked, as shown at arrow 620. Locking may be done in accordance with the embodiments of FIGS. 4 and 5 above, for example.

The portable container may be locked, for example, in the field when gathering evidence or at a warehouse for goods in which the source is important, among other options.

Based on the locking action, a report may be made to server 618, shown as report 622. Such report may be made in real time upon the container being locked in one embodiment. However, in other embodiments, the portable container computing device 610 may merely store a timestamp and event indicator in a log on the computing device and report 622 may be made at a subsequent time. The report may further include information including one or more of: credentials of the party that caused the locking action, the location of the locking action, a timestamp, environmental conditions, or an image of the person performing the locking action, among other options.

Computing device 610 may then become associated with computing device 612. As used herein, associated means that communications have been established between the computing devices. Such communications may be short range communications indicating that computing device 610 is in the proximity of computing device 612. In other embodiments, the communications may be long range communications and the association may be based on geographic boundaries, among other options. In the embodiment of FIG. 6, the association is shown with arrow 630. For example, computing device 612 may be affixed to a police vehicle and the association may occur when an evidence box having computing device 610 is placed within such police vehicle. Alternatively, computing device 612 may be affixed to a shipping container and the association may occur when a cargo box having computing device 610 is placed within such shipping container. Alternatively, computing device 612 may be affixed at an entrance to a shipping yard and the association may occur when a cargo box having computing device 610 proceeds past such entrance. Other options are possible.

Based on the association, computing device 610 may provide a report 632 to server 618 indicating the association. Further, computing device 612 may also provide a report 634 indicating the association. In some cases, the lack of a report from one of the computing devices may create an alert condition at server 618.

However, in other cases, the association may be logged within the computing device 610 or computing device 612 and reports 632 or 634 may be made at a subsequent time, for example when reporting a group of events. In this case, server 618 may compare the reports once the logs are provided to the server. The server may expect such logs to be reported within a threshold time period.

Subsequently, computing device 610 may become associated with a computing device 614, as shown by arrow 640 in the embodiment of FIG. 6. For example, computing device 614 may be a distribution warehouse and when a vehicle associated with computing device 612 arrives at the distribution warehouse then the computing device 610 may become associated with that distribution warehouse.

Based on the association, computing device 610 may provide a report 642 to server 618. Further, computing device 614 may provide a report 644. Again such reports may be done immediately upon association or may be logged and reported periodically to server 618.

Computing device 612 may receive an indication that it is no longer associated with computing device 610, which may further be reported to server 618 as report 646.

In a similar manner, computing device 610 may become associated at a subsequent time of computing device 616, as shown by arrow 650. In this regard, computing device 610 may provide a report to server 618, shown by report 652. Further, the association may trigger a report 654 from computing devices 616 and the disassociation with computing device 614 may trigger a report 656. Again such reports may be based on the logs which may be periodically reported to server 618.

In the embodiment of FIG. 6, an unlocking event 660 may further cause a report 662 to sever 618.

The reports in the embodiment of FIG. 6 may identify the computing device making the report and the computing device an association is established with. The report may include timestamps for when the association occurred and when disassociation occurred. Further, environmental data such as the temperature within the container may be provided. Further, position data may in some cases be provided. Other supplemental information may also be included.

The embodiment of FIG. 6 provides for chain of custody of the portable container by providing data from a plurality of sources to server 618, which may then cross-reference such data. Thus, for example, if computing device 610 reports an association with a computing device 612 and computing device 612 fails to report such association to server 618, then an anomalous condition may exist. For example, computing device 610 may be interacting with an illegitimate computing device in this case.

Further, a time of transfer between containers or from a container to a vehicle for the portable container may be logged. Such logging may trigger alerts if the time of transfer is longer than a threshold time period. For example, if the transfer of the container from a first truck to a second truck should take at most five minutes but in reality takes fifteen minutes, this may trigger an alert by a server 618.

Further, anomalous events on the computing device 610 may also be reported to server 618 and cause alerts or security situations. For example, if the container is opened at a time prior to the arrival at the final destination, this may trigger an alarm.

In other cases, supplemental data may also be provided. For example, if the computing device 610 measured the temperature within the portable container, this may reported to server 618. Computing device 614 may also record the temperature. If the temperature recorded by computing device 614 does not match the temperature reported by computing device 610, this may indicate an anomalous condition and may trigger an alarm at server 618.

Other options are possible.

Figure 7:
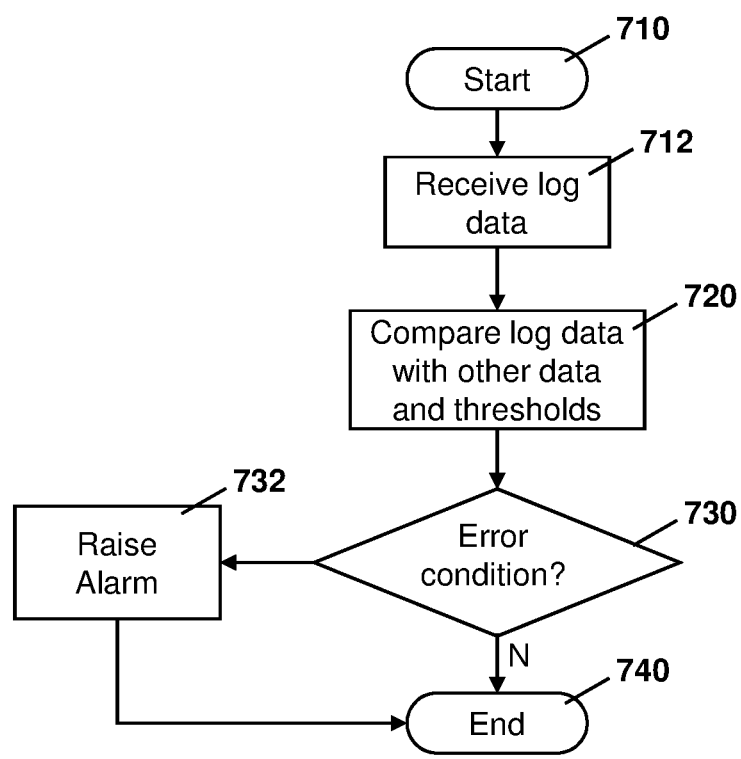
FIG. 7 is a process diagram showing a process at a server for identifying anomalies in logs.

Thus, reference is now made to FIG. 7. The process of FIG. 7 is performed at a server such as server 618 from FIG. 6.

The process of FIG. 7 starts at block 710 and proceeds to block 712, in which the server receives log data. Such log data may be received from the computing device associated with the portable container having the goods requiring the chain of custody monitoring, or may be received from a computing device of a vehicle or building to which the portable container becomes associated.

The process then proceeds to block 720 in which the log data that is received at block 712 as compared with other data and thresholds that may be set within the server 618. Specifically, the log data may provide details about the associations, positions, temperatures, or other sensor information, and such data may be compared with related log data received from other entities within the network.

Further, the log data may be checked at block 720 for conditions such as time of transfer, temperature thresholds, location anomalies, among other conditions.

Based on the check at block 720, the process proceeds to block 730 to determine whether an error condition exists. For example, if log data from the two devices does not match, or if thresholds for such log data are exceeded then an error condition may exist. In this case, the process proceeds to block 732 in which an alarm is raised with regard to the chain of custody.

If no error condition exists, then the process proceeds from block 730 to block 740 and ends.

Further, once the alarm is raised at block 732, the process proceeds to block 740 and ends.

The above is, for example, illustrated using several use cases provided below.

Counterfeit Goods Use Case

In accordance with one embodiment of the present disclosure, a luxury goods maker may want to show that the luxury goods originated at the production facility. Thus, in this case, the authenticity of the goods is desired to be verified by the received.

The authenticity may be verified using a shipment where the container for shipping is equipped with a computing device as described in FIG. 2 above, and corresponding transfer points are also equipped with computing devices as described in FIGS. 1 and 6 above.

Figure 8:
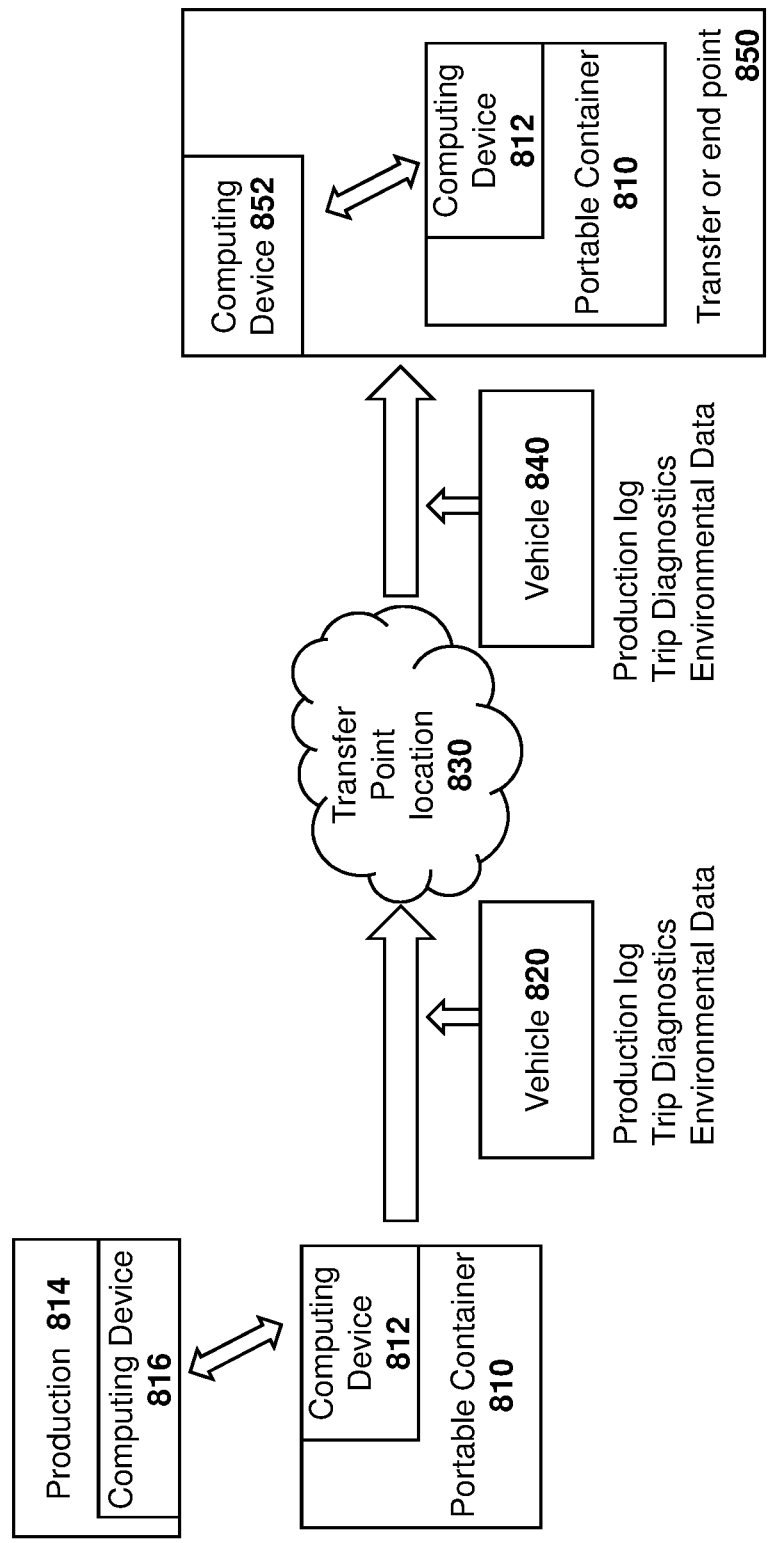
FIG. 8 is a block diagram showing a chain of custody case for luxury goods.

Reference is now made to FIG. 8. In the embodiment of FIG. 8, a shipping box or portable container 810 includes computing device 812, which may include a mechanism for actuating a lock on the portable container as described above with regards to FIGS. 4 and 5. A production facility 814 may have a computing device 816 that interacts with computing device 812, and may provide logging information such as a production log.

Computing device 812 may store production information, location, locking information, among other possible information.

Thereafter, the portable container 810 may be transferred to a ship which has a computing device that interacts with computing device 812.

Thereafter, at a transfer point 830, which may be a shipping yard, the portable container 810 and in particular the computing device 812 communicates with a computing device at the transfer point.

Subsequently, the portable container 810 may be loaded to the truck 840, which may have a computing device.

The endpoint 850 is then reached. Endpoint 850 has a commuting device 852 which may communicate with computing device 812. The portable container may be unlocked at this point to retrieved the goods, where such event is logged.

The computing device 812 then has a log which may be uploaded to a server indicating trip diagnostics, environmental data, and/or production logs, among other options. Further, computing devices for ship 820, transfer point 830, truck 840 and transfer or end point 850 may provide logs or data to the server, which may analyze the logs to look for anomalies in accordance with the embodiment of FIG. 7. If there are no anomalies, then the receiver can be certain about the origin of the goods in the portable container 810.

In some cases, not all of the transfer points will have computing devices to interact with the portable container. In this case, the security of the portable container itself may be used to verify the chain of custody by ensuring that the box was not opened during such leg of the trip, by determining whether the time between transfer points is within threshold limits, among other options.

Law Enforcement Use

In a second use case, law enforcement agencies may use a portable container such as that described above for transferring evidence from a crime scene to an evidence storage facility or lab. A chain of custody attack is very common tactic used to exclude evidence in courtroom situations. In this regard, an evidence strongbox may be equipped with a computing device in accordance with the above, and a corresponding evidence lockup may also be equipped with such device.

Figure 9:
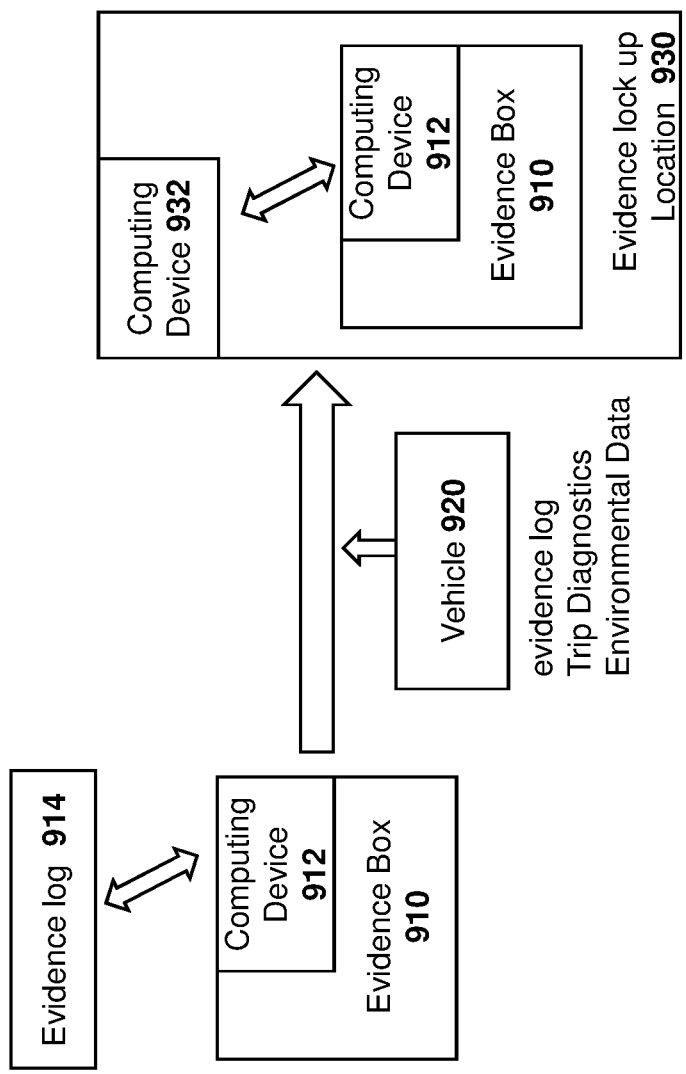
FIG. 9 is a block diagram showing a chain of custody case for evidence in a crime.

Reference is now made to FIG. 9. In the embodiment of FIG. 9, an evidence box 910 includes computing device 912. Crime scene evidence may be placed into the evidence box and the box locked, where such events are logged.

The evidence box may then be transported using a vehicle 920 to an evidence lock location 920. A computing device may log the evidence log, trip diagnostics and environmental data during such transfer. The evidence lock 930 may include a computing device 932, which may communicate with the evidence box and in particular with computing device 912. Thereafter, the evidence box, and in particular computing device 912, may upload its logs to a server. Further, the evidence lock up may also upload the logs to the server, which may then look for anomalous behavior in accordance with the embodiment of FIG. 7.

The logs themselves provide a chain of custody indicating when the evidence box was opened and closed.

In further embodiments, during transfer, a police vehicle may be equipped with a computing device to provide further logging of the trip.

In further embodiments, a transfer point may exist. For example, the evidence may need to proceed to a second location at which point it may be transferred before being taken to the evidence lock up location 930. If such transfer location is equipped with a computing device, such transfer location may further be used for the log of the chain of custody.

Proximity

In accordance with a further use case of the present disclosure, two or more containers need to be transported together. The containers in this embodiment may be equipped with proximity sensors to determine whether such containers remain in proximity during transport. Such proximity sensor may, for example, comprise a short range communication mechanism such as near field communications, Bluetooth, Bluetooth Low Energy, ZigBee, Infrared signaling, among other options.

Containers may need to be transported in proximity in various situations. For example, one container may have environment sensing capabilities while the other does not. By ensuring the containers are transported together, the environmental conditions of transport can be assured for the container that does not have such sensors. This may be important for perishable items, biologicals, pharmaceuticals, or certain types of evidence.

In other cases, one container may have logging capabilities while the other does not. In this case, the integrity of the load may depend on the log of the computing device in proximity to the container.

Figure 10:
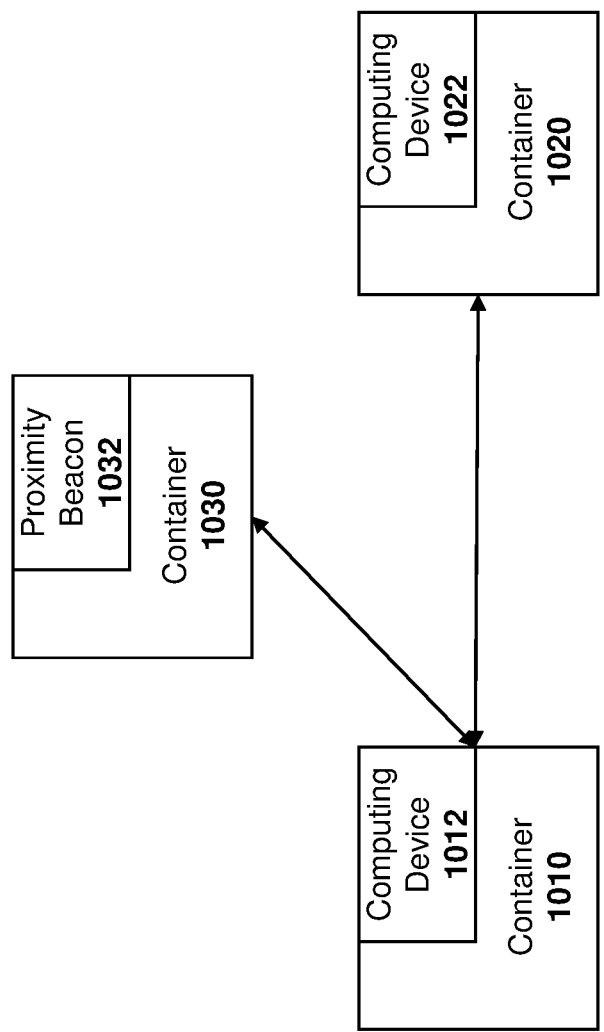
FIG. 10 is a block diagram showing a container interacting with one or more other containers to ensure proximity.

Reference is now made to FIG. 10. In the embodiment of FIG. 10, a container 1010 has a computing device 1012. Such computing device may be, for example, similar to computing device 210 from FIG. 2 above.

In one embodiment, a container 1020 having a computing device 1022 may need to stay in proximity of container 1010. In order to check such proximity, computing device 1012 or computing device 1022 may send a short range communication to the other computing device. In this case, the other computing device may provide a response.

The communicating of the short range communication and any response received may be logged at each computing device.

The sending of the proximity check may be based on a trigger. For example, the trigger may be a time based trigger where proximity is checked periodically. Alternatively, or in addition to a time based check, an event based trigger may be used. Such event may be a signal from a server, or may be a sensor detecting a condition such as movement, light level changes, temperature changes, among other options.

If the proximity check fails to detect the other container, in one embodiment the event may be logged. Further, in some cases the computing device 1012 may raise an alarm by sending a signal to a server.

In some cases, a container 1030 may not have a computing device such as that described above. In this case, the container may be provided with a proximity beacon 1032. The proximity beacon 1032 may send periodic signals which could be detected and logged by computing device 1012. The proximity beacon 1032 may also transmit in some cases when events such as movement, change of light level, change of temperature, among other events, are detected.

In the case of container 1030, since it does not include a computing device having logging capabilities, the integrity of the load within the container 1030 would rely on the proximity logs at computing device 1012.

Other examples are possible. The present disclosure is therefore not limited to the above use cases but can be used in a variety of situations in which the chain of custody is important for the goods or products being shipped.

Based on the above, a computing device associated with a container may interact with other computing devices during transit. Logging of the actuation of the lock, along with supplemental information from the portable container, as well as logging from the other computing devices on the transit path may then be correlated at a server looking for anomalies. Such interactions secure the chain of custody from the source to the destination.

A server such as servers 340, 342 or 618 may be any network node or element. For example, one simplified server that may perform the embodiments described above is provided with regards to FIG. 11.

Figure 11:
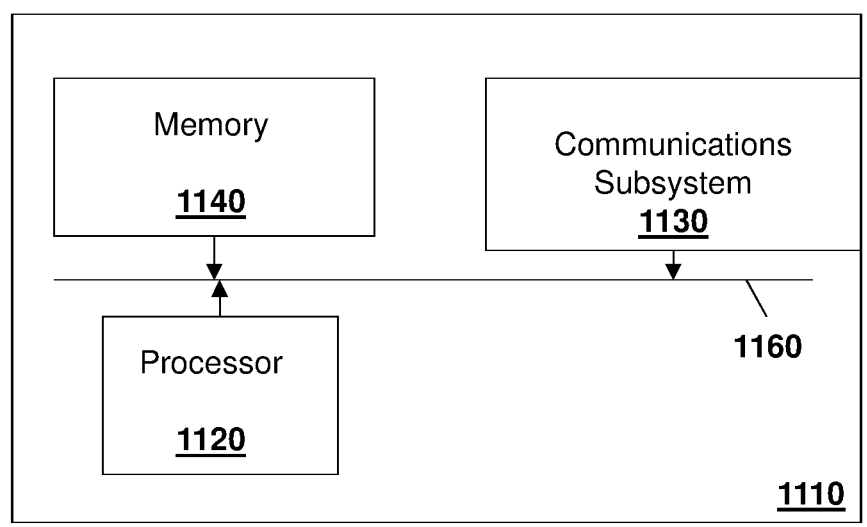
FIG. 11 is a block diagram of an example computing device or server capable of being used with the embodiments of the present disclosure.

In FIG. 11, server 1110 includes a processor 1120 and a communications subsystem 1130, where the processor 1120 and communications subsystem 1130 cooperate to perform the methods of the embodiments described herein.

The processor 1120 is configured to execute programmable logic, which may be stored, along with data, on the server 1110, and is shown in the example of FIG. 11 as memory 1140. The memory 1140 can be any tangible, non-transitory computer readable storage medium, such as optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1140, the server 1110 may access data or programmable logic from an external storage medium, for example through the communications subsystem 1130.

The communications subsystem 1130 allows the server 1110 to communicate with other devices or network elements.

Communications between the various elements of the server 1010 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method comprising:
   controlling, with one or more processors, a lock actuating mechanism to lock a portable container, wherein a first computing device is associated with the portable container;
   receiving, with the one or more processors, a first report generated by the first computing device in response to the locking of the portable container;
   receiving, with the one or more processors, a second report generated by the first computing device in response to a short-range wireless communication between the first computing device and a second computing device associated with a transit element, wherein the second report indicates that an association was established with the second computing device;

receiving, with the one or more processors, a third report generated by the second computing device in response to the short-range wireless communication between the first computing device and the second computing device, wherein the third report indicates that an association was established with the first computing device;

controlling, with the one or more processors, the lock actuating mechanism to unlock the portable container;

receiving, with the one or more processors, a fourth report generated by the first computing device in response to the unlocking of the portable container; and verifying, with the one or more processors, a chain of custody of one or more goods in the portable container based on the first, second, third, and fourth reports.

2. The method of claim 1, wherein a cloud based server comprises at least some of the one or more processors.

3. The method of claim 1, wherein the lock actuating mechanism is controlled to unlock the portable container in response to a verification of one or more policy conditions.

4. The method of claim 3, wherein the verification of the one or more policy conditions comprises verifying one or more cryptographic keys.

5. The method of claim 3, wherein the verification of the one or more policy conditions comprises:
decrypting data with a cryptographic key; and
verifying a timestamp, a geolocation, or sensor data of the decrypted data.

6. The method of claim 5, wherein the verification of the one or more policy conditions further comprises verifying that the portable container is within a predetermined geographical boundary.

7. The method of claim 5, wherein the verification of the one or more policy conditions further comprises verifying that the portable container will be unlocked within a predetermined time window.

8. The method of claim 5, wherein the verification of the one or more policy conditions further comprises:
verifying that the portable container is within a predetermined geographical boundary; and
verifying that the portable container will be unlocked within a predetermined time window.

9. The method of claim 1, wherein the first computing device is affixed to the portable container, wherein the second computing device is affixed to the transit element, and wherein the transit element is positioned along a transit path of the portable container.

10. The method of claim 1, wherein the portable container comprises the first computing device, wherein the transit element comprises the second computing device, and wherein the transit element is positioned along a transit path of the portable container.

11. The method of claim 1, wherein verifying the chain of custody comprises cross-referencing the second and third reports to determine whether an anomalous condition exits.

12. The method of claim 11, wherein the second report comprises a first timestamp for when the association was established with the second computing device, wherein the third report comprises a second timestamp for when the association was established with the first computing device, and wherein the cross-referencing comprises comparing the first and second timestamps.

13. The method of claim 12, wherein the second report comprises a third timestamp for when a disassociation occurred with the second computing device, wherein the third report comprises a fourth timestamp for when a disassociation occurred with the first computing device, and wherein the cross-referencing further comprises comparing the third and fourth timestamps.

14. The method of claim 11, wherein the second report comprises a first geographic location for where the association was established with the second computing device, wherein the third report comprises a second geographic location for where the association was established with the first computing device, and wherein the cross-referencing comprises comparing the first and second geographic locations.

15. The method of claim 11, wherein the second report comprises a first temperature reading read by a first sensor of the first computing device, wherein the third report comprises a second temperature reading read by a second sensor of the second computing device, and wherein the cross-referencing comprises comparing the first and second temperature readings.

16. The method of claim 11, wherein each of the second and third reports comprises a timestamp and a geographic location for the short-range wireless communication between the first computing device and the second computing device.

17. The method of claim 16, wherein the first and fourth reports are also cross-referenced with the second and third reports to determine whether the anomalous condition exits, wherein the first report comprises a timestamp and a geographic location for the locking of the portable container, and wherein the fourth report comprises a timestamp and a geographic location for the unlocking of the portable container.

18. The method of claim 11, wherein verifying the chain of custody further comprises determining that each of the first, second, third, and fourth reports were received within one or more predetermined amounts of time.

19. A system comprising one or more processors configured to:
control a lock actuating mechanism to lock a portable container, wherein a first computing device is associated with the portable container;
receive a first report generated by the first computing device in response to the locking of the portable container;
receive a second report generated by the first computing device in response to a short-range wireless communication between the first computing device and a second computing device associated with a transit element, wherein the second report indicates that an association was established with the second computing device;
receive a third report generated by the second computing device in response to the short-range wireless communication between the first computing device and the second computing device, wherein the third report indicates that an association was established with the first computing device;
control the lock actuating mechanism to unlock the portable container;
receive a fourth report generated by the first computing device in response to the unlocking of the portable container; and
verify a chain of custody of one or more goods in the portable container based on the first, second, third, and fourth reports.

20. A non-transitory computer readable medium having instructions stored thereon that, when executed by one or more processors, cause the one or more processors to:

control a lock actuating mechanism to lock a portable container, wherein a first computing device is associated with the portable container;
receive a first report generated by the first computing device in response to the locking of the portable container;
receive a second report generated by the first computing device in response to a short-range wireless communication between the first computing device and second computing device associated with a transit element, wherein the second report indicates that an association was established with the second computing device;
receive a third report generated by the second computing device in response to the short-range wireless communication between the first computing device and the second computing device, wherein the third report indicates that an association was established with the first computing device;
control the lock actuating mechanism to unlock the portable container;
receive a fourth report generated by the first computing device in response to the unlocking of the portable container; and
verify a chain of custody of one or more goods in the portable container based on the first, second, third, and fourth reports.

\* \* \* \* \*